Oct. 24, 1950     E. V. VARCOE     2,527,281
DRIVE MECHANISM FOR SELF-PROPELLED VEHICLES
Filed April 4, 1946     3 Sheets-Sheet 1
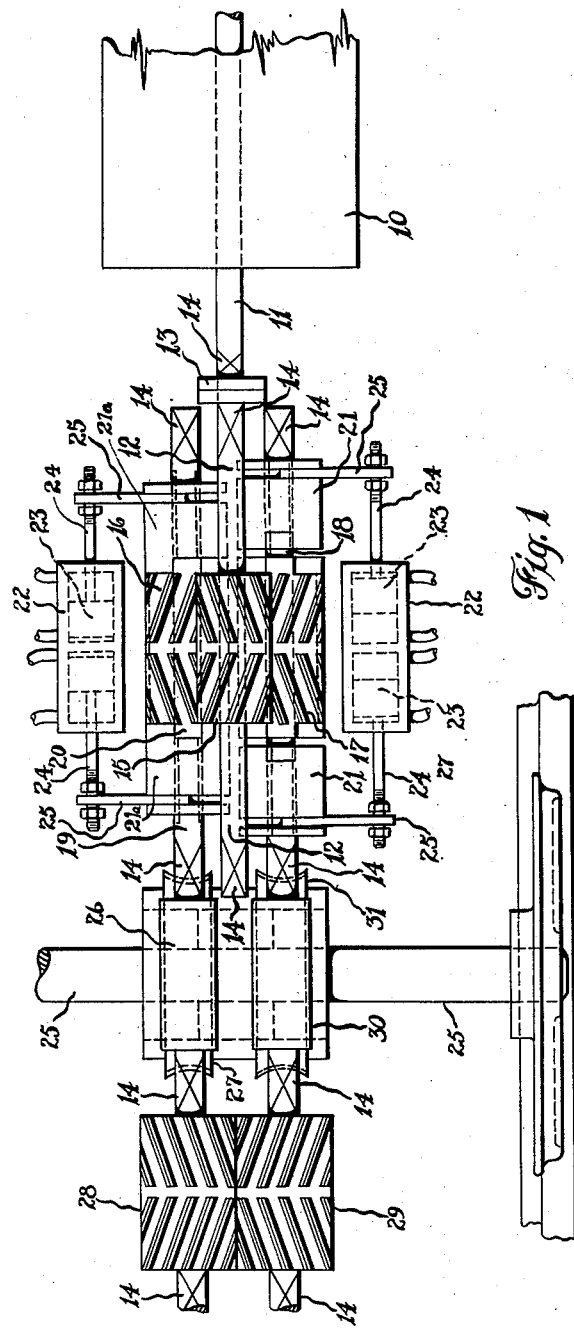
Witness:
Inventor
Earl V. Varcoe
Attorney.

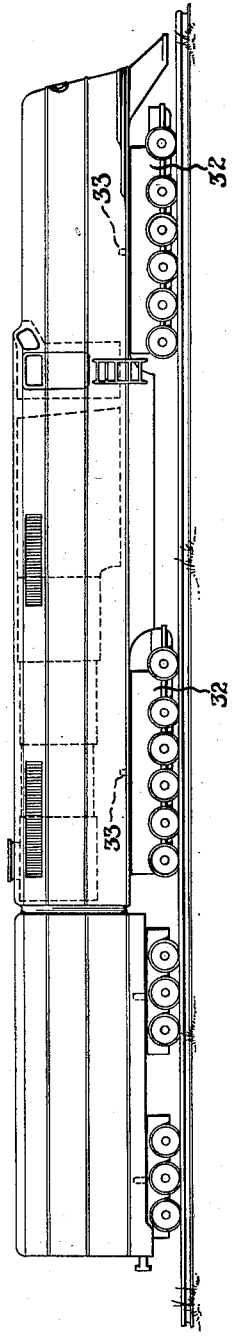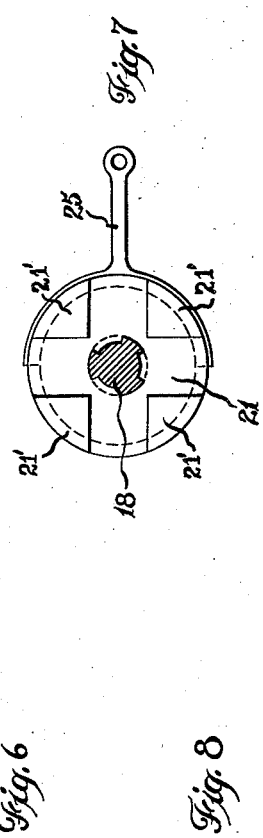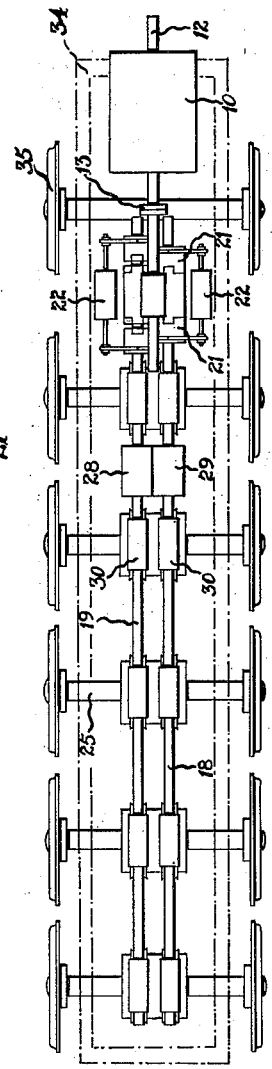

Oct. 24, 1950 E. V. VARCOE 2,527,281
DRIVE MECHANISM FOR SELF-PROPELLED VEHICLES
Filed April 4, 1946 3 Sheets-Sheet 3

Witness;
Ann H. Backus

Inventor
Earl V. Varcoe
by Hyde W. Ballard
Attorney.

Patented Oct. 24, 1950

2,527,281

UNITED STATES PATENT OFFICE 2,527,281

DRIVE MECHANISM FOR SELF-PROPELLED VEHICLES

Earl V. Varcoe, Roxborough, Pa., assignor of one-half to Paul H. Hoffken

Application April 4, 1946, Serial No. 659,584

7 Claims. (Cl. 105—119)

My invention relates to reversing mechanisms for locomotives and is particularly adapted to locomotives using steam turbines as prime movers.

Since it is well known that the steam turbine is a non-reversible prime mover in contrast to the reciprocating engine, considerable difficulty and great expense have been necesary in adapting the more efficient turbine for use in transportation vehicles. It has been proposed to utilize a secondary turbine for reversing only, and locomotives with such separate reverse turbines have been constructed. On these locomotives, however, it has been found necessary to employ driving links between the driving wheels which in turn necessitate wheels of large diameter and accurate counter-balancing of the wheels themselves to prevent serious damage to the rails and roadbed from pounding.

An object of my invention, therefore, is to provide a unitary truck for a locomotive having a central drive shaft geared to the axle of each pair of driving wheels.

A still further object of my invention is to provide an efficient reversing mechanism whereby a single unidirectional turbine may be used to drive the locomotive both forwards and backwards.

A further object of my invention is to provide a unitary locomotive driving truck which has high traction, short turning radius, and small diameter driving wheels.

A further object of my invention is to provide a unitary truck for a locomotive having a turbine rigidly mounted thereon, a plurality of drive shafts between the turbine and the driving axles, worm gears on the drive shafts and a loosely fitting spider in the worm gear assembly permitting slight movement of the axles relative to the frame.

Further objects will be apparent from the specification and drawings, in which:

Fig. 1 is a fragmentary plan view of a unitary driving truck constructed in accordance with my invention showing the reversing mechanism;

Fig. 2 is an elevation of the structure of Fig. 1;

Fig. 6 is an elevation of a locomotive utilizing a pair of my unitary driving trucks;

Fig. 7 is a detail of the splined clutch collar; and

Fig. 8 is a diagrammatic plan view of my unitary driving truck assembly.

Figure 3:
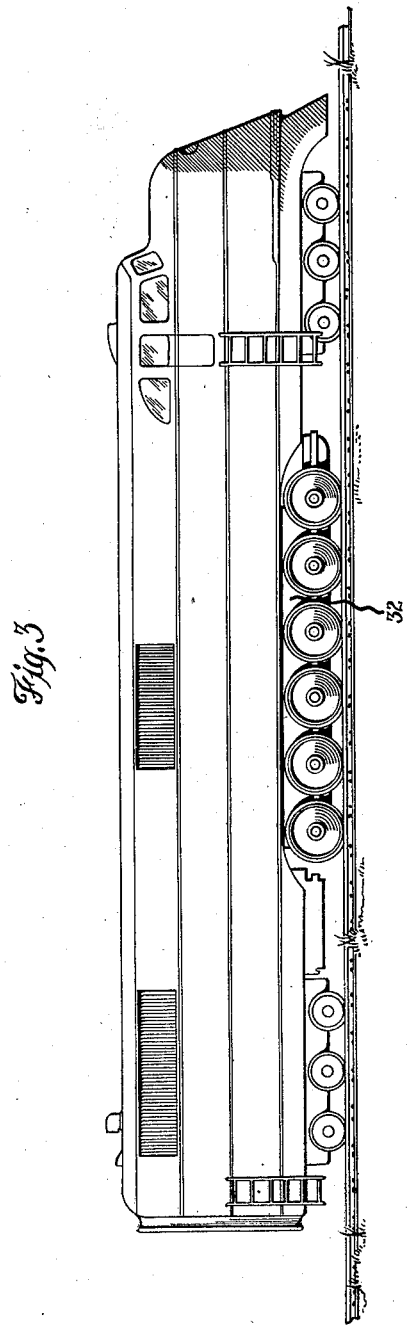
Fig. 3 is an elevation of a locomotive utilizing a single unitary driving truck.

While certain novel features of the invention are disclosed herein with considerable detail with respect to certain particular forms of the invention, it is not desired to be limited to such details since many changes and modifications may well be made without departure from the spirit of the invention in its broadest aspect.

Referring now to Fig. 1, turbine 10 is illustrated diagrammatically, it being understood that the turbine may be of any well known single or multi-stage design suitable for developing the torque required. Turbine shaft 11 is connected to primary drive shaft 12 through flexible coupling 13.

For the purposes of clarity, the supporting structure for the mechanism has been omitted, but it will be appreciated that all of the shafts will be supported on bearings which are conventionally illustrated and all designated by the numeral 14 regardless of the actual specifications that would be employed for each location.

A herringbone gear 15 is rigidly mounted on primary shaft 12 connected to coupling 13 and turbine shaft 11. Gear 15 is in constant mesh with gears 16 and 17 rotatably mounted on longitudinal drive shafts 18 and 19. Gears 16 and 17 are provided with teeth or dogs 20 at either end of the gears in such a manner that the gears 15 and 16 may be selectively connected in driving relation with axially disposed collars 21 and 21a which are slidable axially on shafts 18 and 19 respectively. It will be understod that collars 21a operate simultaneously to engage and drivingly connect gear 16 with shaft 19, whereas collars 21 simultaneously operate to drivingly connect gear 17 with its associated shaft 18. This driving connection is accomplished through a plurality of teeth or dogs 21' on collars 21 and 21a which in driving position engage the teeth 20 on the gears. Collars 21 and 21a are slidably but non-rotatably mounted on shafts 18 and 19 by means of splines or other suitable connections to transmit driving torque from the gears 16 and 17 to shafts 18 and 19 selectively.

The construction of gears 16 and 17 is identical, as is likewise that of shafts 18, 19 and collars 21, 21a. However, since both gears 16 and 17 mesh with gear 15, it will be apparent that only one of the gears 16 or 17 can be locked to its secondary shaft at a time. To provide controlling means for selectively operating collars 21, 21a, I have shown a pair of air cylinders 22 enclosing pistons 23 connected to collars 21, 21a by means of rods 24 and yokes 25.

Pistons 23 are caused to operate in cylinders 22 by any fluid means which may be either air, oil, or steam. It will also be understood that if desired the clutch collars 21, 21a may be operated mechanically through suitable linkages.

Fig. 1 illustrates collars 21 in disengaged position with gear 17, whereas, the other pair of collars 21a are shown as engaged with gear 16. In this position, driving torque is transmitted from shaft 11, coupling 13, shaft 12, through gear 15, then to gear 16, then to collars 21a and shaft 19 by means of the splined attachment between collars 21a and shaft 19. Shaft 19 is connected to axle 25 through worm gear 26 and worm wheel 27. Shaft 19 also has rigidly attached thereto, herringbone gear 28 meshing with gear 29 on shaft 18. Shaft 18 is likewise connected to axle 25 by means of worm gear 30 and worm wheel 31 having an opposite pitch from gears 26 and 27. Thus when torque is being transmitted through shaft 19, as illustrated in Fig. 1, axle 25 is driven both through worm gears 26 and in the same direction through worm gears 30 by means of the inter-connection of shafts 18 and 19 through gears 28 and 29. In this condition, gear 17 will, of course, be turning idly on shaft 18 and in the opposite direction.

I propose to utilize the unitary truck 32 (Fig. 3) employing as many driving wheels as may be consistent with the diameter of the wheels and their spacing in order to negotiate the curves found in ordinary railroad practice. Shafts 18 and 19 will be long enough to transmit torque to each wheel.

The advantage in using a unitary truck swiveled at a central point such as 33 in the form shown in Fig. 6 is that sharp curves can be negotiated at higher speeds. When side rods are utilized, it is necessary to employ a relatively large diameter wheel in order to get sufficient starting torque. With my construction, I propose to substantially reduce the diameter of the wheels, increase their number, thus achieving higher starting torque without sacrificing tractive effort. In addition, it will be apparent that another advantage of my construction is that sudden jerks heretofore necessary to start a heavy train will not be necessary. Past practice has often required that the driving wheels be deliberately slipped in order to start the train, but this disadvantage will be eliminated by the use of my construction.

Referring to Fig. 8, each truck 32 has a suitable frame 34 shown in phantom with journals for supporting axles 25. For the sake of clarity, the details of the bearing supports are not shown. The driving truck illustrated in Fig. 8 has five driven axles and one free axle 35 to support the weight of turbine 10. It will be understood that the relationship between driven and free axles can be varied to meet the requirements of the particular type and size of locomotive or vehicle under construction but an important feature of my invention resides in the fact that I have devised a means whereby a greater number of small diameter driving wheels can be successfully employed in conjunction with a steam turbine.

Figure 5:
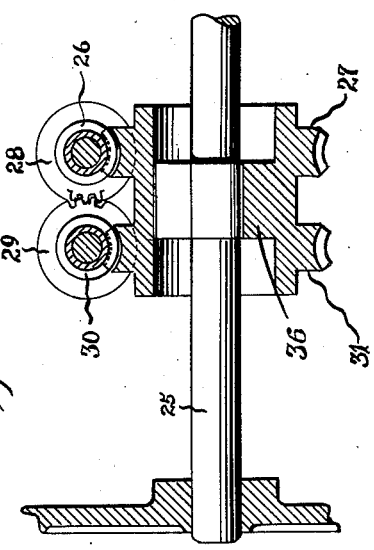
Fig. 5 is a section taken along line 5—5 of Fig. 2.
Figure 4:
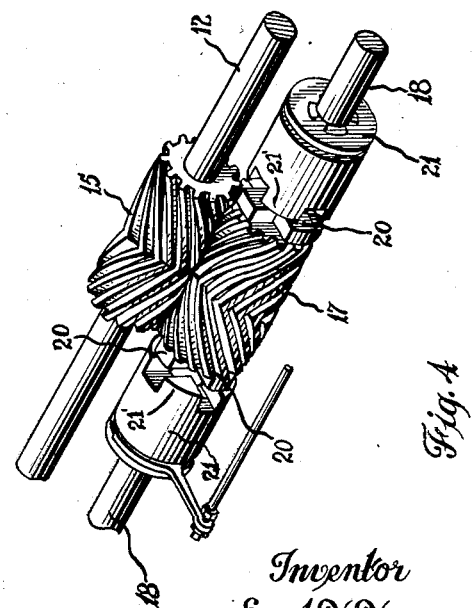
Fig. 4 is a perspective detail of the reversing gear and control.

In order to provide for irregularities in the road bed, I employ a loose fitting spider connection 36, as shown in Fig. 2 and Fig. 5, between axle 25 and gears 27 and 30. This construction is well known in the art and may, if desired, be installed in the outer ends of axle 25 instead of at the center.

Having thus described my invention, I claim:

1. In locomotive driving mechanism, a driving truck comprising a frame, a turbine mounted on said frame, a turbine shaft disposed longitudinally of said frame, a primary driving shaft, a flexible coupling connecting said primary driving shaft to the turbine shaft, a herringbone gear rigidly attached to said primary driving shaft, a pair of driven herringbone gears in constant mesh with said driving herringbone gear, a forward longitudinal drive shaft about which one of the said driven gears revolves, a reverse longitudinal drive shaft about which the other driven gear revolves, splined portions on the forward and reverse drive shafts, a pair of internally splined clutch collars for sliding on each of the drive shafts and adapted to engage the driven herringbone gear on each shaft, and a fluid cylinder containing movable pistons operatively connected to the clutch collars to move them longitudinally on the splined shafts whereby driving torque is selectively transmitted between one herringbone gear and its associated clutch collars to the longitudinal drive shaft associated with the gear and collar.

2. In locomotive driving mechanism, a driving truck comprising a frame, a turbine mounted on said frame, a turbine shaft disposed longitudinally of said frame, a primary driving shaft, a flexible coupling connecting said primary driving shaft to the turbine shaft, a herringbone gear rigidly attached to said primary driving shaft, a pair of driven herringbone gears in constant mesh with said driving herringbone gear, a forward longitudinal drive shaft about which one of the said driven gears revolves, a reverse longitudinal drive shaft about which the other driven gear revolves, splined portions on the forward and reverse drive shafts, a pair of internally splined clutch collars for sliding on each of the drive shafts, a fluid cylinder containing movable pistons operatively connected to the clutch collars to move them longitudinally on the splined shafts, teeth on the collars mating with corresponding teeth on each of the driven gears whereby when one of the driven gears is engaged with its corresponding collars the primary driving shaft transmits torque through the driving gear to the driven gear, the collars, and the shaft, a geared connection in constant mesh between the forward and the reverse shafts causing them to turn in opposite directions, a plurality of drive wheels, a plurality of driven axles for the drive wheels, a pair of worm gears on each driven axle meshing with worm gears on the drive shafts, said worm gears having opposite pitches, and bearings for mounting the axles and drive shafts in the frame.

3. In locomotive driving mechanism, a driving truck comprising a frame, a turbine mounted on said frame, a turbine shaft disposed longitudinally of said frame, a primary driving shaft, a flexible coupling connecting said primary driving shaft to the turbine shaft, a herringbone gear rigidly attached to said primary driving shaft, a pair of alternately driven herringbone gears in constant mesh with said driving herringbone gear, a forward longitudinal drive shaft about which one of the said driven gears revolves, a reverse longitudinal drive shaft about which the other driven gear revolves, splined portions on the forward and reverse drive shafts, a pair of internally splined clutch collars for sliding on each of the drive shafts, a fluid cylinder containing movable pistons operatively connected to each pair of clutch collars to move them longitudinally on the splined shafts, teeth on the collars mating with corresponding teeth on each of the driven gears whereby when one of the driven gears is engaged with its corresponding collars the primary driving shaft transmits torque through the driving gear to the driven gear, the collars, and the shaft, and a geared connection in constant mesh between the forward and the reverse shafts causing them to turn in opposite directions.

4. In locomotive driving mechanism, a driving truck comprising a frame, a turbine mounted on said frame, a turbine shaft disposed longitudinally of said frame, a primary driving shaft, a flexible coupling connecting said primary driving shaft to the turbine shaft, a herringbone gear integrally attached to said primary driving shaft, a pair of driven herringbone gears in constant mesh with said driving herringbone gear, a forward longitudinal drive shaft about which one of the said driven gears revolves, a reverse longitudinal drive shaft about which the other driven gear revolves, splined portions on the forward and reverse drive shafts, a pair of internally splined clutch collars for sliding on each of the drive shafts, a fluid cylinder containing movable pistons operatively connected to each pair of clutch collars to move them longitudinally on the splined shafts, and teeth on the collars mating with corresponding teeth on each of the driven gears whereby when one of the driven gears is engaged with its collars the primary driving shaft transmits torque through the driving gear to the engaged driven gear, the collars, and the shaft, the other driven gear acting as an idler gear turning on its shaft in a direction opposite to the shaft.

5. A locomotive driving truck assembly comprising a frame, at least one pair of driving wheels journaled on said frame, an axle associated with each pair of driving wheels, driving means including a pair of worm wheels mounted on and in driving connection with said axles, two longitudinally extending drive shafts journaled on the frame, driving means including a pair of worm gears mounted on each drive shaft, said worm gear means being in mesh with said worm wheel means, a reversible driving connection between one drive shaft and the other drive shaft, said reversible connection including a pair of intermeshing gears in driving connection with each shaft, a turbine mounted on the frame, a turbine drive shaft for transmitting torque from the turbine to the longitudinal drive shafts, a driving connection between the turbine drive shaft and one of said longitudinal drive shafts, a driving connection between the turbine drive shaft and the other of said longitudinal drive shafts, and means for selectively engaging and disengaging said last-named driving connections between the turbine shaft and the longitudinal shafts.

6. A locomotive driving truck assembly comprising a frame, at least one pair of driving wheels journaled on said frame, an axle associated with each pair of driving wheels, driving means including a pair of worm wheels mounted on and in driving connection with said axles, two longitudinally extending drive shafts journaled on the frame, driving means including a pair of worm gears mounted on each drive shaft, said worm gear means being in mesh with said worm wheel means, a reversible driving connection between one drive shaft and the other drive shaft, said reversible connection including a pair of intermeshing gears in driving connection with each shaft, a turbine mounted on the frame, a turbine drive shaft for transmitting torque from the turbine to the longitudinal drive shafts, a driving connection between the turbine drive shaft and one of said longitudinal drive shafts, a driving connection between the turbine drive shaft and the other of said longitudinal drive shafts, a second gear mounted on each of said longitudinal shafts, a gear on the turbine shaft in constant mesh with each of said second gears, and means for selectively driving one or the other of the longitudinal shafts through one of the second-named gears on said shafts.

7. A locomotive driving truck assembly comprising a frame, at least one pair of driving wheels journaled on said frame, an axle associated with each pair of driving wheels, driving means including a pair of worm wheels mounted on and in driving connection with said axles, two longitudinally extending drive shafts journaled on the frame, driving means including a pair of worm gears mounted on each drive shaft, said worm gear means being in mesh with said worm wheel means, a reversible driving connection between one drive shaft and the other drive shaft, said reversible connection including a pair of intermeshing gears in driving connection with each shaft, a turbine mounted on the frame, a turbine drive shaft for transmitting torque from the turbine to the longitudinal drive shafts, a driving connection between the turbine drive shaft and one of said longitudinal drive shafts, a driving connection between the turbine drive shaft and the other of said longitudinal drive shafts, a second gear on one of said longitudinal shafts, a second gear on the other of said longitudinal shafts, a gear on the turbine shaft in constant mesh with each of said second gears whereby said second gears rotate in opposite directions, a clutch associated with each of said second gears for transmitting torque from the gears to its associated shaft, and means for selectively engaging and disengaging said clutches to reverse the direction of rotation of each of the longitudinal shafts.

EARL V. VARCOE.

REFERENCES CITED

The following references are of record in the file of this patent:

UNITED STATES PATENTS

| Number | Name | Date |
|---|---|---|
| 852,939 | Fairman | May 7, 1907 |
| 870,202 | Sponsel | Nov. 5, 1907 |
| 1,438,319 | Macleod | Dec. 12, 1922 |
| 1,447,488 | Schneider | Mar. 6, 1923 |
| 2,024,688 | Gray | Dec. 17, 1935 |
| 2,424,543 | Alben | July 29, 1947 |

FOREIGN PATENTS

| Number | Country | Date |
|---|---|---|
| 685,859 | France | Apr. 7, 1930 |
| 312,027 | Germany | May 12, 1919 |